United States Patent
Wu (10) Patent No.: US 11,037,275 B2
(45) Date of Patent: Jun. 15, 2021

(54) COMPLEX ARCHITECTURE FOR IMAGE PROCESSING

(71) Applicant: Tencent Technology (Shenzhen) Company Limited, Guangdong (CN)

(72) Inventor: Lei Wu, Shenzhen (CN)

(73) Assignee: Tencent Technology (Shenzhen) Company Limited, Guangdong (CN)

(*) Notice: Subject to any disclaimer, the term of this patent is extended or adjusted under 35 U.S.C. 154(b) by 219 days.

(21) Appl. No.: 15/991,818

(22) Filed: May 29, 2018

(65) Prior Publication Data

US 2018/0276797 A1    Sep. 27, 2018

Related U.S. Application Data

(63) Continuation of application No. PCT/CN2017/072284, filed on Jan. 23, 2017.

(30) Foreign Application Priority Data

Mar. 17, 2016  (CN) .......................... 201610154448.8

(51) Int. Cl.
| | |
|---|---|
| *G06T 5/00* | (2006.01) |
| *G06T 15/50* | (2011.01) |
| *G06T 7/11* | (2017.01) |
| *G06T 11/60* | (2006.01) |
| *G06T 7/90* | (2017.01) |

(Continued)

(52) U.S. Cl.
CPC ................ *G06T 5/005* (2013.01); *G06T 5/50* (2013.01); *G06T 7/11* (2017.01); *G06T 7/90* (2017.01); *G06T 11/001* (2013.01); *G06T 11/60* (2013.01); *G06T 15/503* (2013.01)

(58) Field of Classification Search
None
See application file for complete search history.

(56) References Cited

U.S. PATENT DOCUMENTS

| | | |
|---|---|---|
| 2003/0065589 A1 | 4/2003 | Giacchetti |
| 2006/0062435 A1 | 3/2006 | Yonaha |
| (Continued) | | |

FOREIGN PATENT DOCUMENTS

| | | |
|---|---|---|
| CN | 101059836 A | 10/2007 |
| CN | 103198470 A | 7/2013 |
| (Continued) | | |

OTHER PUBLICATIONS

Guo, D.—"Digital Face Makeup by Example"—IEEE 2009—pp. 73-79 (Year: 2009).*

(Continued)

*Primary Examiner* — Bernard Krasnic
(74) *Attorney, Agent, or Firm* — Brinks Gilson & Lione (57) ABSTRACT

A system allows for editing images. The system accepts a first image including multiple pixels with corresponding pixel information as an input. The system divides the first image into multiple segmented regions based on the pixel information. The system identifies a segmented image from a first segmented region of the segmented regions. The system accepts a template image comprising an image rendering parameter as another input. The system generates a second image corresponding to the first image based on the template image and the segmented image.

20 Claims, 4 Drawing Sheets

(51) Int. Cl.
*G06T 5/50* (2006.01)
*G06T 11/00* (2006.01)

(56) References Cited

U.S. PATENT DOCUMENTS

| | | | | |
|---|---|---|---|---|
| 2010/0027961 | A1* | 2/2010 | Gentile | G06T 5/50 386/278 |
| 2012/0327172 | A1* | 12/2012 | El-Saban | G06K 9/00228 348/14.02 |
| 2013/0258138 | A1* | 10/2013 | Ma | H04N 5/272 348/239 |
| 2015/0146987 | A1* | 5/2015 | Tang | G06K 9/00221 382/195 |
| 2017/0140543 | A1* | 5/2017 | Eliraz-Levonai | G06K 9/00228 |
| 2017/0142371 | A1* | 5/2017 | Barzuza | H04N 7/152 |

FOREIGN PATENT DOCUMENTS

| | | |
|---|---|---|
| CN | 103632165 A | 3/2014 |
| CN | 104102896 A | 10/2014 |
| CN | 104811684 A | 7/2015 |
| CN | 105184296 A | 12/2015 |

OTHER PUBLICATIONS

Office Action dated Mar. 22, 2019 for Chinese Application No. 201610154448.8, and Machine Translation, 13 pages.
Zhen, Beibei et al. "A digital face make-up algorithm based on example image," Journal of Yunnan University (Natural Sciences Edition), No. S2 vol. 2 ISSN: 0258-7071, Nov. 15, 2010 (6 pages).
International Search Report and Written Opinion of PCT/CN2017/072284 dated Apr. 5, 2017 (11 pages).
Office Action dated Nov. 1, 2018 for Chinese Application No. 201610154448.8 (8 pages).

* cited by examiner

COMPLEX ARCHITECTURE FOR IMAGE PROCESSING

PRIORITY

This patent application claims priority to PCT Application No. PCT/CN2017/072284, filed on Jan. 23, 2017, titled IMAGE PROCESSING METHOD AND TERMINAL. PCT Application No. PCT/CN2017/072284 claims priority to Chinese patent application 201610154448.8, filed on Mar. 17, 2016, the entire contents of which is hereby incorporated by reference.

FIELD OF THE INVENTION

This disclosure generally relates to image processing.

BACKGROUND

With the popularization of portable image capture devices (e.g., a cellphone having a camera), various image processing tools have emerged to carry out image processing processes such as retouching images captured by the image capture devices. Continued improvements in the quality, speed and, accuracy of such image processing tools will increase consumer demand.

BRIEF SUMMARY OF THE DISCLOSURE

The present disclosure provides image processing techniques and architectures.

An example may include a method. The method may include inputting a first image including a plurality of pixels, each pixel corresponding to a pixel information. The method may further include dividing the first image into a plurality of segmented regions based on the pixel information. The method may further include identifying a segmented image from at least one segmented region in the segmented regions. The method may further include inputting a template image comprising at least one image rendering parameter. The method may further include generating a second image corresponding to the first image based on the template image and the segmented image.

Optionally, the method may include generating the second image further includes performing at least one of the following operations: screen blending, soft light blending, and alpha blending based on the template image and the first segmented image.

Optionally, the method may include the segmented regions are divided based on a maximum flow minimum cut algorithm.

Optionally, generating the second image may include converting the at least one segmented region of the first image to a first intermediate image corresponding to grayscale information of the at least one segmented region of the first image. In this option, generating the second image may further include converting the at least one segmented region of the first image from RGBA (red, green, blue, alpha) format to HSV (hue, saturation, value) format. In this option, generating the second image may further include extracting a second intermediate image corresponding to brightness information of the at least one segmented region of the first image. In this option, generating the second image may further include generating a third intermediate image by performing histogram equalization on the second intermediate image based on the segmented image.

Optionally, the method may include generating a fourth intermediate image by performing scaling on the template image based on the identified segmented region.

Optionally, the method may include generating a screen result image by performing screen blending on the first image and the first intermediate image. In this option, the method may further include generating a soft light result image by performing soft light blending on at least two of the screen result image, the fourth intermediate image, and the third intermediate image, In this option, the method may further include generating the second image by performing alpha blending on the soft light result image and the fourth intermediate image.

In an example, a terminal may include input circuitry and a processing circuitry. The input circuitry is configured to input a first image including a plurality of pixels, each pixel corresponding to a pixel information. The input circuitry is further configured to input a template image. The template image includes image rendering parameters. The processing circuitry is configured to divide the first image into a plurality of segmented regions based on the pixel information. The processing circuitry is further configured to identify a segmented image from at least one segmented region in the segmented regions. The processing circuitry is further configured to generate a second image corresponding to the first image based on the template image and the segmented image.

Optionally, the processing circuitry is configured to generate the second image by performing at least one of the following operations: screen blending, soft light blending, and alpha blending based on the template image and the segmented image.

Optionally, the processing circuitry is configured to divide the first image into the segmented regions based on a maximum flow minimum cut method.

Optionally, the processing circuitry is configured to convert the at least one segmented region of the first image to a first intermediate image corresponding to grayscale information of the at least one segmented region of the first image. In this option, the processing circuitry is configured to convert the at least one segmented region of the first image from RGBA format to HSV format. In this option, the processing circuitry is configured to extract a second intermediate image corresponding to brightness information of the at least one segmented region of the first image. In this option, the processing circuitry is configured to generate a third intermediate image by performing histogram equalization on the second intermediate image based on the segmented image.

Optionally, the processing circuitry is also configured to generate a fourth intermediate image by performing scaling on the template image based on the at least one segmented region.

Optionally, the processing circuitry is configured to generate a screen result image by performing screen blending on the first image and the first intermediate image. In this option, the processing circuitry is configured to generate a soft light result image by performing soft light blending on at least two of the screen result image, the fourth intermediate image, and the third intermediate image. In this option, the processing circuitry is configured to generate the second image by performing alpha blending on the soft light result image and the fourth intermediate image.

In an example, a non-transitory computer readable storage medium comprises a computer readable program stored thereon, wherein, when being executed, the computer readable program causes a computing device to implement an image processing method. The image processing method may include inputting a first image including a plurality of pixels, each pixel corresponding to a pixel information. The image processing method may further include dividing the first image into a plurality of segmented regions based on the pixel information. The image processing method may further include identifying a segmented image from at least one segmented region in the segmented regions. The image processing method may further include inputting a template image comprising at least one image rendering parameter. The image processing method may further include generating a second image corresponding to the first image based on the template image and the segmented image.

Other examples consistent with the present disclosure can be understood by those skilled in the art in light of the description, the claims, and the drawings of the present disclosure.

By using the disclosed image processing method and terminal, a first image including a plurality of pixels is inputted, pixel information in the first image is analyzed, segmented regions are obtained based on the pixel information, and a segmented image is identified from at least one of the segmented regions. A template image is inputted, and the template image includes at least one image rendering parameter. A second image is generated by processing the first image corresponding to the first image based on the template image and the segmented image. Accordingly, by using the disclosed technical solution, image blending is performed on the specific regions (e.g., a hair region) in the first image based on the inputted template image, thus realizing customized blending effects of the specific regions (e.g., the hair region), and greatly improving operation experience of the user.

BRIEF DESCRIPTION OF THE DRAWINGS

The accompanying drawings forming a part of the present disclosure are included to provide a further understanding of the present disclosure. Example embodiments of the present disclosure and description thereof are adopted to illustrate the present disclosure, and not intended to form improper limits to the present disclosure. In the drawings.

DETAILED DESCRIPTION

Various embodiments of the present disclosure will be described hereinafter with reference to the accompanying drawings.

In various systems, regarding images of a scene including a human face, existing image processing tools may carry out a retouching process for designated regions (e.g., a hair region, etc.) in the images. However, when carrying out a retouching process for designated regions (e.g., a hair region, etc.) of the images, instead of a process for rendering designated regions, the existing image processing tools merely support a process for rendering designated colors of the input images, thus preventing the user to obtain better operation experience. Various implementations of the disclosed image processing techniques and architectures are directed to solving, at least partially, the problems set forth above and other problems. The present disclosure provides image processing techniques and architectures that, in some cases, address the issue that existing techniques do not support a rendering process on designated regions of input images.

Applying a rendering process, such as a templated rendering process, to a selected region, such as one of multiple segmented regions within an image, may increase the efficiency and accuracy of the underlying image rendering hardware. For example, applying a rendering process to a selected segment may reduce the likelihood that hardware resources are applied to process rendering on areas that do not require rendering. Further, increased speed, efficiency, and accuracy may improve the overall user experience in correction to image processing hardware and image processing tools. Accordingly, the techniques and architectures discussed including, for example, applying a rendering template, dividing an image into segmented regions, and identifying a segmented image, improve the operation of the underlying image processing hardware and offer improvements over existing market solutions.

Figure 1:
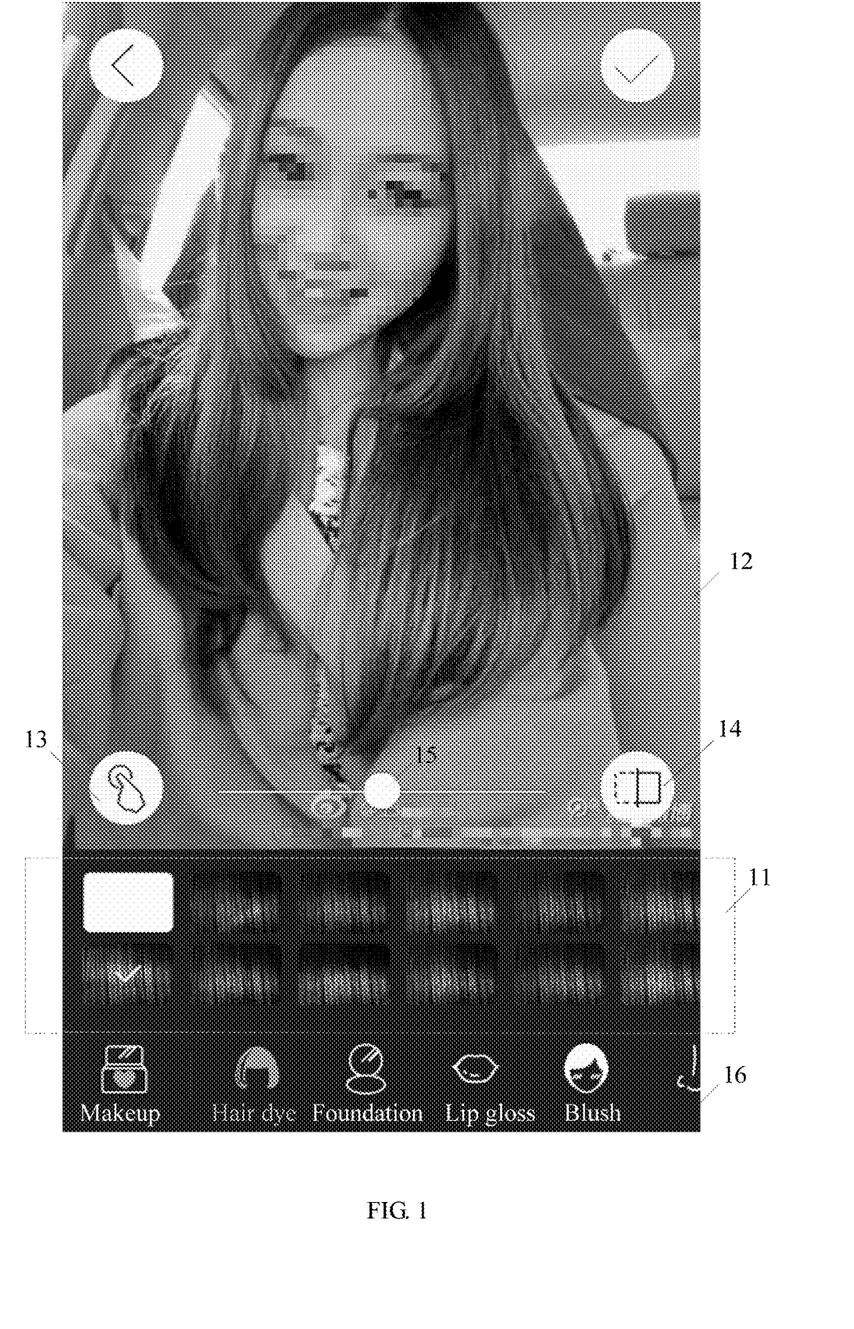
FIG. 1 illustrates an application scenario of an example image processing method consistent with disclosed embodiments.

FIG. 1 illustrates an application scenario of an example image processing method consistent with disclosed embodiments. The disclosed image processing method may be applied to a terminal. The terminal may be an electronic device, such as a cellphone, a tablet, a digital camera, a laptop or a desktop, capable of running an image processing tool (e.g., a software or an APP). For example, when the terminal is a cellphone, the terminal may run an image processing tool, and the image processing tool may support processing of the images in the terminal. The image processing tool may include a graphical user interface as shown in FIG. 1. For an image to be processed that includes a human face, the image processing tool may provide various functionalities (e.g., as shown in bottom line of FIG. 1) such as, skin beautification, and hair beautification, or other beautification. The disclosed image processing method may be directed to segment a specific/designated region in an image, process the segmented region in the image, and the segmented region may, for example, be a region displaying hair, e.g. a hair region. An image includes a plurality of pixels, and each pixel corresponds to a pixel information. The pixel information may include, for example, grayscale value, RGBA channel values, coordinates in the image, or the data values That is, the disclosed processing method may be directed to process the hair region in an image. For example, the graphical user interface as shown in FIG. 1 may include a hair color template region 11, a photo area 12, a manual button 13, a comparison button 14, a blend sliding control 15, and a function bar 16. When a user selects "hair dye" option in the function bar 16, the hair color template region 11 may be displayed on the screen. The hair color template region 11 may display various hair color template images for user selection. When the user selects one template, the terminal may perform the disclosed image processing method to change the hair color of the image shown in the photo area 12 according to the user selected template.

Example Embodiment 1

Figure 2:
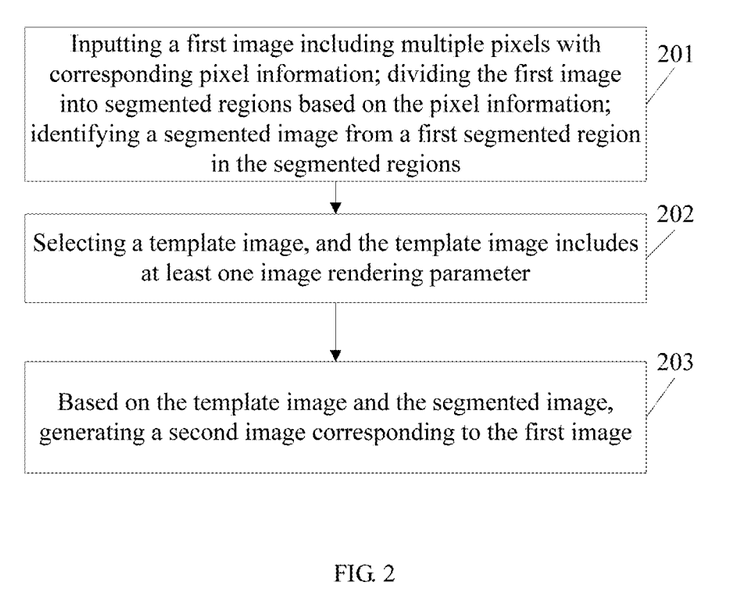
FIG. 2 illustrates a flow chart of an example image processing method in example embodiment 1.

The present disclosure provides an image processing method. FIG. 2 illustrate a flow chart of an example image processing method consistent with example embodiment 1. As shown in FIG. 2, the method may include inputting a first image including a plurality of pixels, each pixel corresponding to a pixel information, dividing the first image into segmented regions based on the pixel information (e.g., by recognizing features of pixel points in the first image), identifying at least one segmented region from the segmented regions (e.g., the segmented region may be identified based on the features of the pixel points), and generating a segmented image (i.e., a mask image) based on the identified segmented region (Step 201). The identified segmented region may be the region of interest (e.g., a hair region or other region). The first image may be inputted according to a user selection. The user may select an image stored locally on the terminal, an image from the internet, or an image just taken by a camera of the terminal. The selected image may be imported as the first image. For example, as shown in FIG. 1, the selfie image of the girl in the photo area 12 may be the first image.

The image processing method may be applied using a terminal. The terminal may be an electronic device, such as a cellphone, a tablet, a digital camera, a laptop or a desktop, capable of running an image processing tool.

Obtaining the segmented region based on the features of the pixel points may include: identifying one or more segmented regions by utilizing a predefined algorithm based on the features of the pixel points. The segmented region may be a recognized hair region. In some implementations, the predefined algorithm may include a maximum flow minimum cut algorithm.

The terminal may establish a Gaussian mixture model (GMM), and utilize the GMM to represent the features of each pixel point of the first image. The segmented region may be identified by utilizing the maximum flow minimum cut algorithm based on the features of each pixel point. The identified segmented region may, for example, be a hair region to be processed. Accordingly, the segmented region may be automatically obtained by using the maximum flow minimum cut algorithm based on GMM. The segmented image (e.g., a mask image) may be generated based on the segmented region, and the segmented image may be a binary image. For example, the segmented image may have the same size as the first image, and the pixel values corresponding to the identified segmented region(s) in the first segmented image may be non-zero (e.g., 136, 255, 511, or other non-zero value), and the pixel values corresponding to the remaining region(s) may be zero. In other words, the first segmented image may function as a mask image of the first image. The non-zero pixels in the first segmented image represent the area of interest (e.g., the hair region) for further processing. The segmented image or mask image corresponding to the first image, may also be referred as the first segmented image.

The image processing method may include inputting a template image, and the template image may include at least one image rendering parameter (Step 202). The first image is the to-be-processed image, and the first image may be selected by an input operation of a user. The template image may be selected by the user via a selection operation in a template image selection region 11 as shown in FIG. 1. The template images in the template image selection region 11 may be pre-configured or customized by the user. For example, the user may swipe left (or use other human interface device input) to browse more selections of pre-configured template images, or may upload an image containing a desired hair color pattern to be used as the template image. The template image in the template image selection region 11 may include at least one parameter selected from color or color combination rendering parameter, and pattern rendering parameter, or other image parameters. These parameters may be extracted/embedded from the template image. As shown in FIG. 1, the pre-configured template images may include hair images with different single colors, gradient color, and other various color patterns. That is, the template images may expand the color variation range and/or pattern variation range, and customized color and/or pattern processing effect may be realized via the input template image. Accordingly, the user may realize personalized operation, and the operation experience of the user may be improved.

The image processing method may include generating a second image corresponding to the first image based on the template image and the segmented image (Step 203). A segmented region may refer to the at least one specific/designated/identified segmented region in the first image (e.g., a region of interest) for further processing in generating the second image. In other words, based on the segmented image, just pixels in the identified segmented region may be processed, and when the second image corresponding to the first image is generated, the difference between the first image and the second image may just occur in the identified segmented region.

Generating the second image corresponding to the first image based on the template image and the segmented image may include: performing at least one of the following operations corresponding to the first image: screen blending, soft light blending, and alpha blending based on the template image and the first segmented image. Image blending may refer to image editing techniques that blend or mix two layers (e.g., an upper layer image and a lower layer image) into each other to produce a blended image. In some implementations, blend modes other than screen blending, soft light blending, and alpha blending may be implemented to generate the second image, such as multiply mode, overly mode, dodge mode, burn mode, arithmetic blend modes, etc. In some implementations, other blending sequences may be performed to generate the second image.

In some implementations, generating the second image based on the template image and the first segmented image may include the following steps. The first image may be converted to a first intermediate image corresponding to grayscale information of the first image. That is, the first intermediate image is a grayscale image converted from the first image. Grayscale information of the one or more identified segmented regions of the first image may be reflected on the first intermediate image. The first intermediate image may not record grayscale information of remaining regions of the first image. The first image may also be converted from RGBA (red, green, blue, alpha) format to HSV (hue, saturation, value) format, a second intermediate image representing brightness information of the first image may be extracted accordingly. The second intermediate image may correspond to brightness information of the one or more identified segmented regions of the first image. Based on the first segmented image, a histogram equalization process may be performed on the second intermediate image to generate a third intermediate image. The one or more identified segmented regions may be recognized, and the template image may be scaled based on the segmented region to generate a fourth intermediate image. The conversions for generating the intermediate images may be performed on just the one or more identified segmented regions of the first image. In the intermediate images, pixels corresponding to the remaining regions of the first image may be unchanged or set to zero.

Additionally or alternatively, screen blending may be performed on the first image and the first intermediate image to obtain a screen result image. Soft light blending may be performed on at least two of the screen result images, the fourth intermediate image, and the third intermediate image to obtain a soft light result image. Alpha blending may be performed on the soft light result image and the fourth intermediate image to obtain the second image.

In some implementations, the first image may be a four-channel color image in the RGBA format. The first intermediate image may be obtained by converting the first image to a single-channel grayscale image via any conversion method in existing techniques.

When the first image is the four-channel color image in the RGBA format, converting the first image from the RGBA format to the HSV format may be realized by virtually any conversion method, and the present disclosure is not intended to be limited to a specific conversion method. The second intermediate image may be formed by extracting the brightness (V) channel data. Histogram equalization may be performed on the second intermediate image based on the first segmented image to improve the contrast of the second intermediate image and obtain the third intermediate image.

In some implementations, identifying the one or more segmented regions in the first segmented image may be based on recognizing the regions in the first segmented image with a pixel value greater than zero. For example, if the identified region is rectangular-shaped, the region may be represented as Rect (x, y, w, h). x and y may represent coordinates of a vertex of the region (e.g., upper left corner point), and w and h may represent the width and height of the region, respectively. In some cases, based on the segmented region (i.e., Rect (x, y, w, h)), scaling may be performed on the template image to generate the fourth intermediate image, and the length and the width of the fourth intermediate image may equal to w and h, respectively. In some implementations, the segmented region may have an irregular shape, and Rect (x, y, w, h) may represent a circumscribed rectangle or a bounding box of the identified segmented region. Some pixels included in the rectangular may have a pixel value of zero (i.e., pixels not in the identified segmented region), correspondingly, after scaling is performed, pixels at same locations in the fourth intermediate image may also have a pixel value of zero.

In some cases, the generation of the first intermediate image, the third intermediate image, and the fourth intermediate image may be performed in different orders in different implementations.

In some cases, the screen result image may be generated by performing screen blending on the first image and the first intermediate image. A function to calculate screen blending may be represented as C1=screen (A, B). The equation used to calculate screen blending may be: C1=1−(1−A)×(1−B). A may represent the pixel value of an upper layer image, B may represent the pixel value of a lower layer image, and C1 may represent a pixel value after screen blending. The upper layer image may be the first image, and the lower layer image may be the first intermediate image. Alternatively, the upper layer image may be the first intermediate image, and the lower layer image may be the first image.

The soft light result image may be generated by performing soft light blending on the screen result image, the fourth intermediate image and the third intermediate image. A function to calculate soft light blending may be represented as: C2=softlight (A, B). An equation to calculate soft light blending may be:

$$A<=0.5: C2=(2\times A-1)\times(B-B\times B)+B;$$

$$A>0.5: C2=(2\times A-1)\times(\text{sqrt}(B)-B)+B;$$

A may represent the pixel value of the upper image, B may represent the pixel value of the lower image, and C2 may represent a pixel value after soft light blending. A<=0.5 may refer to a brightness less than or equal to 50% of the grayscale and, correspondingly, A>0.5 may indicate that the brightness is greater than 50% of the grayscale, and sqrt (B) may represent a square root function. The upper image may be the screen result image, and the lower image may be a combination of the fourth intermediate image and the third intermediate image (or just the fourth intermediate image). Alternatively, the upper image may be the combination of the fourth intermediate image and the third intermediate image, and the lower image may be the screen result image.

In some cases, the second image may be generated by performing alpha blending on the soft light result image and the fourth intermediate image. A function to calculate alpha blending may be represented as: C3=alpha (A, B, a). An equation for alpha blending may be: C3=alpha×A+(1−alpha)×B. A may represent the pixel value of the upper image, B may represent the pixel value of the lower image, C3 may represent the pixel value after alpha blending, and alpha (a) may represent a weighted value of the alpha blending. The weighted value of the alpha blending alpha (a) may have a range of 0~255. The upper layer image may be the soft light result image, and the lower image may be the fourth intermediate image. Alternatively, the upper image may be the fourth intermediate image, and the lower image may be the soft light result image. In some implementations, the soft light result image and the third intermediate image may be multiplied to obtain a multiplied image. The multiplied image may be combined with the screen result image to obtain a combined image. The upper layer image may be the first image, the lower layer image may be the combined image, and the alpha value of the fourth intermediate image may be the alpha weighted value for alpha blending.

When the second image is generated, the graphical user interface (GUI) may be updated. Using the GUI shown in FIG. 1 as an example, the photo area 12 may be updated with the second image. In the second image, the hair color of the girl may have the same color pattern as the template image 112 that the user selected from the template image selection region 11. The comparison button 14 may be configured to present the before and after effects of the hair color adjustment. For example, when the comparison button 14 is pressed, the first image is shown in the photo area 12 (or the first image and the second image is shown in parallel in the photo area 12), and when the comparison button 14 is not pressed, the second image is shown in the photo area 12.

In some implementations, the blend sliding control 15 may correspond to the alpha weighted value in the alpha blending step. The user may manually adjust the sliding bar on the blend sliding control 15 to select a desired blend intensity. The value range of the blend sliding control 15 may be, for example, 0% (left end) to 100% (right end).

In some implementations, a manual mode may be provided to modify the recognized segmented region with user input guidance. As shown in FIG. 1, when a user selects the manual button 13, the manual mode may be entered. In the manual mode, the image is shown in the photo area 12, and a "color brush" option and an "eraser brush" option may be given. When the color brush option is selected, an area that the user brushed over may be added to the segmented region. When the eraser brush option is selected, an area originally included the segmented region that the user brushed over is subtracted from the segmented region. When applying the color brush or the eraser brush on the screen (e.g., the user has not released the finger or the mouse), the brushed area may appear to be white. When the user is finished with the brush stroke (e.g., the user releases the finger or the mouse), the brushed area may reflect the newly changed result accordingly. In other words, step 203 may be repeated using the updated segmented region. The area selected by the color brush may reflect the selected hair template image, and the area selected by the eraser brush may remove the hair color effect.

By using implementations of the disclosed technical solution, the segmented region (e.g., a hair region) may be recognized based on the features of the pixel points in the image without relying on the human face recognition information. Accordingly, the robustness of the image processing may be effectively improved, and for the images where the human face cannot be recognized, the image rendering process of the specific region (e.g., the hair region) may still be realized. Thus, the operation experience of the user may be improved. By supporting the image rendering process of the specific region (e.g., the hair region) of the first image based on the input template image, customized rendering effect of the specific region (e.g., the hair region) may be realized, thus greatly improving the operation experience of the user.

Example Embodiment 2

Figure 3:
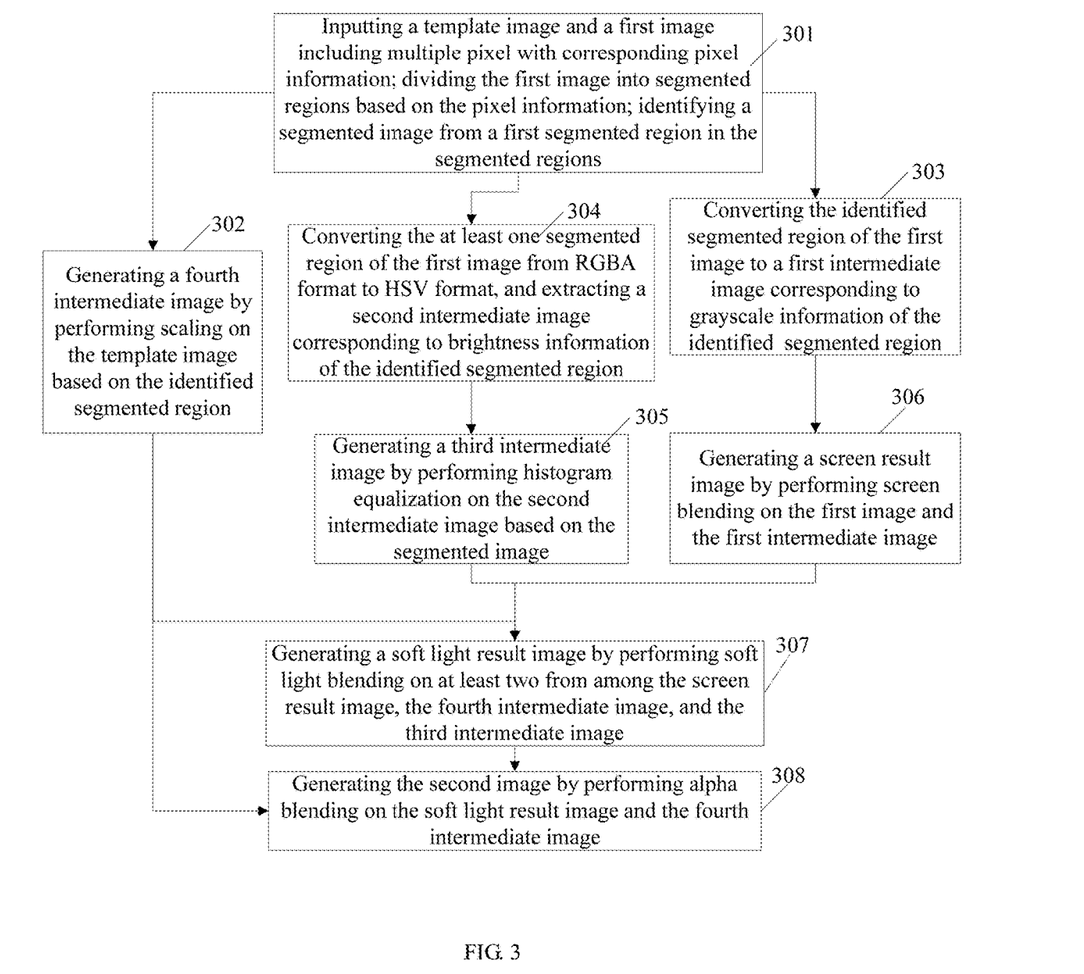
FIG. 3 illustrates a flow chart of an example image processing method in example embodiment 2.

FIG. 3 illustrates a flow chart of an example image processing method consistent with example embodiment 2. As shown in FIG. 3, the image processing method may include inputting the first image and the template image, dividing the first image into segmented regions based on pixel information of the first image (e.g., by recognizing the features of the pixel points of the first image), identifying at least one segmented region from the segmented regions (e.g., the segmented region may be identified based on the features of the pixel points), and generating the segmented image based on the identified segmented region (Step 301). The template image may include image rendering parameters.

The disclosed image processing method may be applied using a terminal. The terminal may be an electronic device, such as a cellphone, a tablet, a digital camera, a laptop or a desktop, capable of running an image processing tool.

The first image may be an image to be processed, and the first image may be selected by an input operation of the user. The template image may be selected by the user via a selection operation in a template image selection region 11 as shown in FIG. 1. The template images in the template image selection region 11 may be pre-configured or customized by the user. Additionally or alternatively, the template image in the template image selection region 11 may include at least one parameter selected from color or color combination rendering parameter, and pattern rendering parameter, etc. That is, the template images may expand the color and/or pattern variation range, and customized color and/or pattern processing effect may be realized via the input template image. Accordingly, the user may realize personalized operation, and the operation experience of the user may be improved.

Dividing the first image into segmented regions and identifying at least one segmented region may include obtaining the segmented region utilizing a predefined algorithm based on the features of the pixel points. The predefined algorithm may include a maximum flow minimum cut algorithm.

The terminal may establish a Gaussian mixture model (GMM), and utilize the GMM to characterize the features of each pixel point of the first image. The segmented region may be obtained by utilizing the maximum flow minimum cut algorithm based on the features of each pixel point. The segmented region may, for example, be a hair region to be processed. The first segmented image may be generated based on the segmented region, and the first segmented image may be a binary image. For example, the pixel values corresponding to the segmented region may be non-zero (e.g., 255 or other numerical value), and the pixel values corresponding to the rest region may be zero.

The inputted first image may be denoted as imgA, the template image may be denoted as imgH, and both imgA and imgH may be four-channel color images. A pixel value of any pixels in the first image (imgA) may be denoted as (R, G, B, A). R may represent red, G may represent green, B may represent blue, and A may represent the weighted value of alpha. The disclosed first segmented image may be denoted as imgM, and imgM may identify the location of the segmented region in the first image. The first segmented image may be a single-channel image, and a pixel value of any pixels in the first segmented image may be denoted as M. The region where pixel values M are greater than zero may represent the segmented region such as the hair region.

The image processing method may include generating the fourth intermediate image by performing scaling on the template image based on the identified segmented region (Step 302).

In some implementations, recognizing the identified segmented region of the first segmented image may be based on recognizing the regions in the first segmented image (imgM) with a pixel value greater than zero, the region may be represented as Rect (x, y, w, h). For example, x and y may represent coordinates of a vertex of the region, and when the region is rectangular-shaped, x and y may represent coordinates of a left top corner point of the region. w and h may represent the width and height of the region, respectively. Accordingly, the range of the region of the segmented region may be represented by Rect (x, y, w, h).

In some cases, based on the segmented region (i.e., Rect (x, y, w, h)), scaling may be performed on the template image to generate the fourth intermediate image, and the fourth intermediate image may be represented as imgH2. The length and the width of the fourth intermediate image (imgH2) may scaled to equal to the values of w and h, respectively. The fourth intermediate image (imgH2) may be a four-channel color image, and the values of the pixels corresponding to imgH2 may be denoted as (Rh, Gh, Bh, Ah).

The image processing method may include converting the at least one segmented region (i.e., identified segmented region) of the first image to a first intermediate image corresponding to grayscale information of the at least one segmented region of the first image (Step 303).

Because the first image (imgA) may be a four-channel color image, the values of the pixels may all be (R, G, B, A). The first intermediate image may be obtained by converting the first image (imgA) to a single-channel grayscale image via any conversion method in existing techniques, and the first intermediate image may be represented as imgG. The first intermediate image (imgG) may be a single-channel image, and the pixel corresponding to the first intermediate image (imgG) may have a value of G.

The image processing method may include converting the at least one segmented region of the first image from the RGBA format to the HSV format, and extracting the second intermediate image corresponding to brightness information of the at least one segmented region of the first image (Step 304).

The method for converting the first image from the RGBA format to the HSV format may refer to any conversion method in existing techniques, which is not described in detail. After being converted to the HSV format, the image may be a three-channel image, including three groups of data, namely, hue (H), saturation (S) and brightness (V). The second intermediate image may be formed by extracting the brightness (V) data, and the second intermediate image may be represented as imgV.

The image processing method may include generating a third intermediate image by performing histogram equalization on the second intermediate image based on the segmented image (S305).

In some implementations, based on the first segmented image (imgM), histogram equalization may be performed on the second intermediate image (imgV). That is, histogram equalization may be performed on the segmented region (e.g., the hair region) of the second intermediate image (imgV) to improve the contrast of the second intermediate image (imgV), namely, the contrast of the segmented region (e.g., the hair region) may be improved, thus obtaining the third intermediate image. The third intermediate image may be represented as imgV2, and the pixel corresponding to imgV2 may have a value of V.

In some cases, Step 302, Step 303, Step 304, and Step 305 may be performed in different orders within different implementations. That is, the generation of the fourth intermediate image, the first intermediate image, and the third intermediate image may be performed in varying orders.

The image processing method may include generating a screen result image by performing screen blending on the first image and the first intermediate image (Step 306).

The image processing method may include generating a soft light result image by performing soft light blending on at least two of the screen result image, the fourth intermediate image, and the third intermediate image (Step 307). In some implementations, the soft light blending image may be generated based on the screen result image and the fourth intermediate image.

The image processing method may include generating the second image by performing alpha blending on the soft light result image and the fourth intermediate image (Step 308). In some implementations, the soft light result image and the third intermediate image may be multiplied to obtain a multiplied image. The multiplied image may be combined with the screen result image to obtain a combined image. The alpha blending may be performed using the first image as upper layer image, the combined image as lower layer image, and the alpha value of the fourth intermediate image as the alpha weighted value for blending.

For regions in imgM with M greater than zero (i.e., the segmented region in the first image), the processed template image (i.e., imgH2) and the processed first image (imgV2) may be combined to perform screen blending, soft light blending, and alpha blending. Screen blending may be performed on the first image (imgA) and the first intermediate image (imgG), and the function to calculate screen blending may be represented as: C1=screen (A, B). In some implementations, the equation to calculate screen blending may be: C1=1−(1−A)×(1−B). A may represent the pixel value of the upper image, B may represent the pixel value of the lower image, and C1 may represent the pixel value after screen blending. The upper image may be the first image, and the lower image may be the first intermediate image. Optionally, the upper image may be the first intermediate image, and the lower image may be the first image.

For the screen result image, soft light blending may be performed combining the fourth intermediate image (imgH2) and the third intermediate image (imgV2). The function to calculate soft light blending may be represented as C2=softlight (A, B). The equation to calculate soft light blending may be:

$$A<=0.5: C2=(2\times A-1)\times(B-B\times B)+B;$$

$$A>0.5: C2=(2\times A-1)\times(\text{sqrt}(B)-B)+B;$$

A may represent the pixel value of the upper image, B may represent the pixel value of the lower image, and C2 may represent a pixel value after soft light blending. A<=0.5 may refer to a brightness less than or equal to 50% gray level and, correspondingly, A>0.5 may indicate that the brightness is greater than 50% gray level, and sqrt (B) may represent the square root function. The upper image may be the screen result image, and the lower image may be a combination of the fourth intermediate image and the third intermediate image. Optionally, the upper image may be the combination of the fourth intermediate image and the third intermediate image, and the lower image may be the screen result image.

Alpha blending may be performed on the soft light result image combining the fourth intermediate image (imgH2). A function to calculate alpha blending may be represented as: C3=alpha (A, B, a). An equation for alpha blending may be: C3=alpha×A+(1-alpha)×B. A may represent the pixel value of the upper image, B may represent the pixel value of the lower image, C3 may represent the pixel value after alpha blending, and alpha (a) may represent a weighted value of alpha blending. The weighted value of alpha blending may have a range of 0~255 or 0~1. The upper layer image may be the soft light result image, and the lower image may be the fourth intermediate image. Optionally, the upper image may be the fourth intermediate image, and the lower image may be the soft light result image.

Using hair region as an example, when the segmented region is the hair region, the template image may correspondingly be a hair color template image, and input data and correlated variables relevant to the disclosed information processing method may include the first image imgA, the first segmented image imgM, the hair color template image imgH, the output result image imgR (i.e., the second image). The input first image imgA may be the four-channel color image with corresponding pixel values of (R, G, B, A). The first segmented image imgM obtained corresponding to imgA may be the single-channel image with a corresponding pixel value of M, and the region with M>0 may be the hair region. The input hair color template image imgH may be four-channel color image with corresponding pixel values of (Rh, Gh, Bh, Ah). The output result image imgR may be a four-channel color image with corresponding pixel values of (R3, G3, B3, A3).

The operation process of the disclosed information processing method may include: 1) counting the regions in imgM with M>0, and calculating to obtain the rectangular Rect (x, y, w, h) (e.g., a bounding box of the regions with M>0). x and y may represent the coordinates of the top left point of the rectangular, and w and h may represent the width and height of the rectangular, respectively.

The operation process may include: scaling imgH according to the rectangular to obtain imgH2. Thus, the length and width of imgH2 may equal to the width w and height h of the rectangular. The operation process may include: inputting imgA, converting the imgA from the RGBA format to the HSV format, and extracting a brightness channel image imgV The operation process may further include: inputting imgA, and converting imgA to a single-channel grayscale image imgG. The operation process may include: performing histogram equalization on the hair region represented as imgM in imgV, thus improving the contrast of imgV and obtaining the image imgV2.

In the above processing process, imgG may be a grayscale image and a single-channel image, given the coordinates of the position (x, y), the corresponding pixel may have a value G. imgV2 may correspond to the hair dye weighted image and may be a single-channel image, given the coordinates of the position (x, y), the corresponding pixel may have a value V. imgA may correspond to the input image and may be the four-channel image, given the coordinates of the position (x, y), the pixel may have a corresponding value (R, G, B, A). imgH2 may correspond to the hair color template image and may be a four-channel image. Given the coordinates of the position (x, y), the corresponding pixel may have a value of (Rh, Gh, Bh, Ah). imgM may be the hair region image and may be a single-channel region. Given the coordinates of the position (x, y), the corresponding pixel may have a value of M. imgR may be the hair dye result image and may be a four-channel image. Given the coordinates of the position (x, y), the corresponding pixel may have a value of (R3, G3, B3, A3).

The function to calculate screen blending may be represented as: C1=screen (A, B), and A, B, C1 may correspond to the pixel values of the upper image, the lower image and the screen blending result image, respectively. The function to calculate soft light blending may be represented as: C2=softlight (A, B), and A, B, C2 may correspond to the pixel values of the upper image, the lower image, and the soft light blending result image, respectively. The function to calculate alpha blending may be represented as: C3=alpha (A, B, a), where A, B, C3 may correspond to the pixel values of the upper image, the lower image, and the alpha blending result image, and a may be an alpha weighted coefficient.

6) Based on imgG, imgV2, imgA, and imgH2, the color dye processing of the hair region may be executed with the following calculation process on imgA, imgV2 and imgH2 for the region with M>0:

$(R0,G0,B0)$=screen$((G,G,G),(R,G,B))$;

$(R1,G1,B1)$=softlight$((Rh,Gh,Bh),(R0,G0,B0))$;

$(R2,G2,B2)=(R1,G1,B1)*(V,V,V)+(R0,G0,B0)$;

$(R3,G3,B3)$=alpha$(((R,G,B),(R2,G2,B2),(Ah,Ah,Ah))$.

For the regions with M<=0, the above process may not be executed. It can be understood that, G in (R, G, B) means green channel value from imgA, and G in (G, G, G) means grayscale value from imgG.

By using the disclosed technical solution, the segmented region (e.g., a hair region) may be recognized based on the features of the pixel points in the image without relying on the human face recognition information. Accordingly, the robustness of the image processing may be effectively improved, and for the images where the human face cannot be recognized, the image rendering process of the specific region (e.g., the hair region) may still be realized. Thus, the operation experience of the user may be improved. By supporting the image rendering process of the specific region (e.g., the hair region) of the first image based on the input template image, customized rendering effect of the specific region (e.g., the hair region) may be realized, thus greatly improving the operation experience of the user.

Example Embodiment 3

Figure 4:
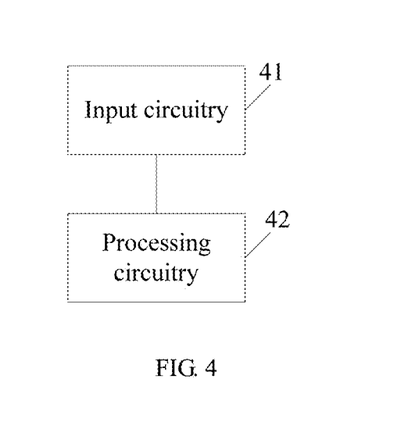
FIG. 4 illustrates a schematic view of an example terminal consistent with disclosed embodiments.

FIG. 4 illustrates a schematic view of an example terminal consistent with various disclosed embodiments. As shown in FIG. 4, the terminal may include an input circuitry 41 and a processing circuitry 42.

The input circuitry 41 may be configured to input the first image, and input the template image. The template image may include at least one image blending parameter. The first image includes a plurality of pixels, each pixel corresponding to a pixel information. The processing circuitry 42 may be configured to divide the first image into a plurality of segmented regions based on the pixel information, identify a segmented image from at least one segmented region in the segmented regions, and generate a second image corresponding to the first image based on the template image and the segmented image. The processing circuitry 42 may be configured to process the first image according to the predefined image processing method based on the template image and the first segmented image to generate the second image.

The terminal may be an electronic device, such as a cellphone, a tablet, a digital camera, a laptop or a desktop, capable of running an image processing tool.

The processing circuitry 42 may be configured to generate the second image by performing at least one of the following operations: screen blending, soft light blending, and alpha blending on the first image based on the template image and the first segmented image.

The processing circuitry 42 may be configured to divide the first image into the segmented regions and obtain the identified segmented region utilizing the predefined algorithm based on the features of the pixel points. The predefined algorithm may include the maximum flow minimum cut algorithm.

The processing circuitry 42 may establish the Gaussian mixture model (GMM), and utilize the GMM to represent the features of each pixel point of the first image. The segmented region may be obtained by utilizing the maximum flow minimum cut algorithm based on the features of each pixel point. The segmented region may, for example, be a hair region to be processed. The first segmented image may be generated based on the segmented region, and the first segmented image may be a binary image. For example, the pixel values corresponding to the segmented region may be non-zero, and the pixel values corresponding to the rest region may be zero.

The first image may be an image to be processed, and the first image may be selected by an input operation of the user. The template image may be selected by the user via a selection operation in a template image selection region 11 as shown in FIG. 1. The template image in the template image selection region 11 may be pre-configured or customized by the user. The template image in the template image selection region 11 may include at least one parameter selected from color or color combination rendering parameter, and pattern rendering parameter, etc.

The processing circuitry 42 may be configured to convert the at least one segmented region of the first image to a first intermediate image corresponding to grayscale information of the at least one segmented region of the first image. The processing circuitry 42 may also be configured to convert the at least one segmented region of the first image from the RGBA format to the HSV format, and extract a second intermediate image corresponding to brightness information of the at least one segmented region of the first image. The processing circuitry 42 may be configured to generate the third intermediate image by performing histogram equalization on the second intermediate image based on the first segmented image. The processing circuitry 42 may be configured to generate a fourth intermediate image by performing scaling on the template image based on the at least one segmented region. The processing circuitry 42 may be configured to generate a screen result image by performing screen blending on the first image and the first intermediate image. The processing circuitry 42 may be configured to generate a soft light result image by performing soft light blending on at least two of the screen result image, the fourth intermediate image, and the third intermediate image. The processing circuitry 42 may generate the second image by performing alpha blending on the soft light result image and the fourth intermediate image.

The first image may be the four-channel color image in the RGBA format. The processing circuitry 42 convert the first image to the single-channel grayscale image via any conversion method in existing techniques.

When the first image is the four-channel RGBA image, converting the first image from the RGBA format to the HSV format may be realized by virtually any conversion method, and the present disclosure is not intended to be limited to a specific conversion method. The second intermediate image may be generated by extracting the data representing the brightness (V). Histogram equalization may be performed on the second intermediate image based on the first segmented image to improve the contrast of the first intermediate image and obtain the third intermediate image.

In some cases, recognizing the segmented region of the first segmented image may be based on recognizing the regions in the first segmented image with a pixel value greater than zero. For example, when the region is rectangular-shaped, the region may be represented as Rect (x, y, w, h). x and y may represent coordinates of a top point of the region, and w and h may represent the width and height of the region, respectively. Based on the segmented region (i.e., Rect (x, y, w, h)), scaling may be performed on the template image to generate the fourth intermediate image, and the length and the width of the fourth intermediate image may equal to w and h, respectively.

In some cases, the generation of the first intermediate image, the third intermediate image, and the fourth intermediate image may be performed in different orders within different implementations.

The processing circuitry 42 may perform screen blending on the first image and the first intermediate image to obtain the screen result image. The function to calculate screen blending may be represented as C1=screen (A, B). The equation used to calculate screen blending may be: $C1=1-(1-A)\times(1-B)$. A may represent the pixel value of the upper layer image, B may represent the pixel value of the lower layer image, and C1 may represent the pixel value after screen blending. The upper layer image may be the first image, and the lower image may be the first intermediate image. Optionally, the upper image may be the first intermediate image, and the lower image may be the first image.

For the screen result image, the soft light blending may be performed combining the fourth intermediate image and the third intermediate image. The function to calculate soft light blending may be represented as C2=softlight (A, B). The equation to calculate soft light blending may be:

$$A<=0.5: C2=(2\times A-1)\times(B-B\times B)+B;$$

$$A>0.5: C2=(2\times A-1)\times(\mathrm{sqrt}(B)-B)+B;$$

A may represent the pixel value of the upper image, B may represent the pixel value of the lower image, and C2 may represent the pixel value after soft light blending. $A<=0.5$ may refer to a brightness less than or equal to 50% gray and, correspondingly, $A>0.5$ may indicate that the brightness is greater than 50% gray, and sqrt (B) may represent the square root function. The upper image may be the screen result image, and the lower image may be a combination of the fourth intermediate image and the third intermediate image. Optionally, the upper image may be the combination of the fourth intermediate image and the third intermediate image, and the lower image may be the screen result image.

Alpha blending may be performed on the soft light result image combining the fourth intermediate image. The function for calculating alpha blending may be represented as: C3=alpha (A, B, a). The equation for alpha blending may be: $C3=\mathrm{alpha}\times A+(1-\mathrm{alpha})\times B$. A may represent the pixel value of the upper image, B may represent the pixel value of the lower image, C3 may represent the pixel value after alpha blending, and alpha (a) may represent a weighted value of alpha blending. The weighted value of alpha blending may have a range of 0~255. The upper layer image may be the soft light result image, and the lower image may be the fourth intermediate image. Optionally, the upper image may be the fourth intermediate image, and the lower image may be the soft light result image.

Example Embodiment 4

Referring again to FIG. 4, the terminal may include the input circuitry 41 and the processing circuitry 42. The input circuitry 41 may be configured to input the first image, and input the template image. The template image may include the image blending parameters.

The processing circuitry 42 may be configured to recognize the features of the pixel points in the first image, obtaining the segmented region based on the features of the pixel points, and generating the first segmented image based on the segmented region. The processing circuitry 42 may be configured recognize the segmented region of the first segmented image, and perform scaling of the template image based on the segmented region, thus generating the fourth intermediate image. The processing circuitry 42 may also be configured to convert the first image to the first intermediate image representing the grayscale image. The processing circuitry 42 may be configured to convert the first image from the RGBA format to the HSV (hue, saturation, value) mode, and extract the second intermediate image representing the brightness data. The processing circuitry 42 may be configured to perform histogram equalization on the second intermediate image based on the first segmented image to generate the third intermediate image. The processing circuitry 42 may be configured to perform screen blending on the first image and the first intermediate image to obtain the screen result image. The processing circuitry 42 may be configured to perform soft light blending on the screen result image, the fourth intermediate image, and the third intermediate image to obtain the soft light result image. The processing circuitry 42 may perform alpha blending on the soft light result image and the fourth intermediate image to generate the second image.

The terminal may be an electronic device, such as a cellphone, a tablet, a digital camera, a laptop or a desktop, capable of running an image processing tool.

The processing circuitry 42 may be configured to obtain the segmented region utilizing the predefined algorithm based on the features of the pixel points. The predefined algorithm may include the maximum flow minimum cut algorithm.

the processing circuitry 42 may establish the Gaussian mixture model (GMM), and utilize the GMM to represent the features of each pixel point of the first image. The segmented region may, for example, be a hair region to be processed. The first segmented image may be generated based on the segmented region, and the first segmented image may be a binary image. For example, the pixel values corresponding to the segmented region may be non-zero, and the pixel values corresponding to the rest regions may be zero. In the present disclosure, the input first image may be represented as imgA, the template image may be represented as imgH, imgA and imgH may both be four-channel color images The pixels corresponding to the first image (imgA) may have values of (R, G, B, A), where A represents red, G represents green, B represents blue, and A represents alpha. The first segmented image may be represented as imgM, and imgM may represent images that perform location calibration of the specific regions of the first image. The first segmented image may be a single-channel image, and the corresponding pixel may have a value of M. The regions with M greater than zero may represent the segmented region, for example, the hair region.

The first image may be an image to be processed, and the first image may be selected by an input operation of the user. The template image may be selected by the user via a selection operation in a template image selection region 11 as shown in FIG. 1. The template image in the template image selection region 11 may be pre-configured or customized by the user, which is not described in detail here. The template image in the template image selection region 11 may include at least one parameter selected from color or color combination rendering parameter, and pattern rendering parameter, etc.

The first image may be a four-channel color image in the RGBA format. The processing circuitry 42 may convert the first image to the single-channel image grayscale image to obtain the first intermediate image. The first intermediate image may be represented as imgG. The first intermediate image (imgG) may be a single-channel image, and the pixel corresponding to the first intermediate image (imgG) may have a value of G.

The first image (imgA) may be the four-channel color image in the RGBA format, and the processing circuitry 42 may convert the first image from the RGBA format to the HSV format using any conversion method in existing techniques, and the present disclosure is not intended to limit the specific conversion method. The processing circuitry 42 may extract the data in the HSV data that represents the brightness (V) to form the second intermediate image. The second intermediate image may be represented as imgV. The processing circuitry 42 may perform histogram equalization on the second intermediate image (imgV) based on the first segmented image (imgM). That is, the processing circuitry 42 may perform histogram equalization on the segmented region (e.g., the hair region) of the second intermediate image (imgV), thus improving the contrast of the second intermediate image and obtaining the third intermediate image. The third intermediate image may be represented as imgV2, and the pixel corresponding to imgV2 may have a value of V.

Recognizing the segmented region of the first segmented image may be based on recognizing the regions in the first segmented image (imgM) with a pixel value greater than zero. For example, when the region is rectangular-shaped, the region may be represented as Rect (x, y, w, h). x and y may represent coordinates of a top point of the region, and w and h may represent the width and height of the region, respectively. Based on the segmented region (i.e., Rect (x, y, w, h)), scaling may be performed on the template image (imgH) to generate the fourth intermediate image, and the length and the width of the fourth intermediate image may equal to the values of w and h, respectively. The fourth intermediate image (imgH2) may be a four-channel color image, and pixels corresponding to imgH2 may have values of (Rh, Gh, Bh, Ah).

In some cases, the generation of the first intermediate image, the third intermediate image, and the fourth intermediate image may be performed in different orders within different implementations.

Screen blending may be performed on the first image (imgA) and the first intermediate image (imgG) to obtain the screen result image. The function to calculate screen blending may be represented as C1=screen (A, B). The equation used to calculate screen blending may be: $C1=1-(1-A)\times(1-B)$. A may represent the pixel value of an upper layer image, B may represent the pixel value of a lower layer image, and C1 may represent a pixel value after screen blending. The upper layer image may be the first image, and the lower image may be the first intermediate image. Optionally, the upper image may be the first intermediate image, and the lower image may be the first image.

For the screen result image, soft light blending may be performed combining the fourth intermediate image (imgH2) and the third intermediate image (imgV2). The function to calculate soft light blending may be represented as: C2=softlight (A, B). An equation to calculate soft light blending may be:

$$A<=0.5: C2=(2\times A-1)\times(B-B\times B)+B;$$

$$A>0.5: C2=(2\times A-1)\times(\text{sqrt}(B)-B)+B;$$

A may represent the pixel value of the upper image, B may represent the pixel value of the lower image, and C2 may represent a pixel value after soft light blending. $A<=0.5$ may refer to a brightness less than or equal to 50% gray and, correspondingly, $A>0.5$ may indicate that the brightness is greater than 50% gray, and sqrt (B) may represent the square root function. The upper image may be the screen result image, and the lower image may be a combination of the fourth intermediate image and the third intermediate image. Optionally, the upper image may be the combination of the fourth intermediate image and the third intermediate image, and the lower image may be the screen result image.

For the soft light result image, the processing circuitry 42 may combine the fourth intermediate image (imgH2) to perform alpha blending. The function for calculating alpha blending may be represented as: C3=alpha (A, B, a). The equation for calculating alpha blending may be represented as $C3=\text{alpha}\times A+(1-\text{alpha})\times B$. A may represent the pixel value of the upper image, B may represent the pixel value of the lower image, C3 may represent the pixel value after alpha blending, and alpha (a) may represent a weighted value of alpha blending. The weighted value of alpha blending may have a range of 0~255. The upper layer image may be the soft light result image, and the lower image may be the fourth intermediate image. Optionally, the upper image may be the fourth intermediate image, and the lower image may be the soft light result image.

In both example embodiment 3 and example embodiment 4, the input circuitry 41 and the processing circuitry 42 in the terminal may both realized by a central processing unit (CPU), a digital signal processor (DSP), or field-programmable gate array (FPGA) in the terminal in actual applications.

Figure 5:
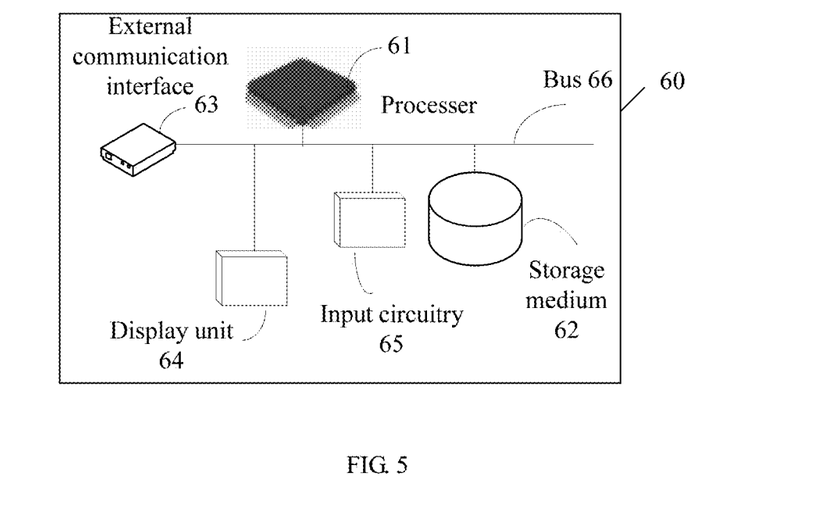
FIG. 5 illustrates a schematic view of a hardware structure of an example terminal consistent with disclosed embodiments.

FIG. 5 illustrates a schematic view of a hardware structure of an example terminal consistent with various disclosed embodiments. The disclosed method and terminal may be implemented on any appropriate computing platform. As shown in FIG. 5, an example computing system 60 or a hardware entity 60 may include a processor 61, a storage medium 62, at least one external communication interface 63, a display circuitry 64, an input circuitry/peripherals 65, one or more buses 66 to couple and connect the devices together, and/or other circuitry. Certain devices may be omitted and other devices may be included.

The processor 61 can include any appropriate processor, processors, or processing circuitry. The processor 61 can include multiple cores for multi-thread or parallel processing. The storage medium 62 may include memory modules, e.g., Read-Only Memory (ROM), Random Access Memory (RAM), and flash memory modules, and mass storages, e.g., CD-ROM, U-disk, removable hard disk, etc. The storage medium 62 may store computer programs for implementing various processes (e.g., running an image processing tool based on inputs from a graphical user interface), when executed by the processor 61. The storage medium 62 may include one or more databases for storing certain data and for performing certain operations on the stored data, e.g., browsing image library.

The display circuitry 64 may include display devices for displaying contents in the computing system 60, e.g., displaying an GUI for image processing, displaying a processed output image, etc. The peripherals 65 may include I/O devices, e.g., touchscreen, camera, keyboard and mouse for inputting information by a user. The peripherals may also include certain sensors, such as gravity sensors, acceleration sensors, and other types of sensors.

The communication interface 63 may include network devices for establishing connections through a communication network (e.g., the Internet or other types of computer networks or telecommunication networks, either wired or wireless). The terminal may, for example, send the input image to a server for certain ones of the image processing steps.

In operation, the computing system 60 may implement the disclosed image processing method and terminal. Various ones of the disclosed embodiments were discussed in the context of processing of the hair region to illustrate the operation of techniques and architectures disclosed. The disclosed method and terminal may be used in other image processing scenarios, such as changing the clothes (segmented region) to a desired pattern according to a template image, or other segmented-image-region image processing.

The foregoing descriptions of the terminal may be similar to the descriptions of the above-described method and, thus, the beneficial effects of the terminal are not repeated here.

In various embodiments of the present disclosure, it should be understood that the disclosed device and method may be implemented in other ways. The device described above is illustrative of the techniques and architectures disclosed, but other devices may be implemented consistent with disclosed techniques and architectures. For example, the circuitry may be partitioned via logical separations. In practice, other partition scenarios may also be possible. For example, various circuitry or components may be combined or integrated into another system, or some features may be omitted or left unexecuted. In addition, mutual coupling, direct coupling, or communication displayed or discussed herein may be indirect coupling or communication connection in electrical, mechanical, or other forms through some interfaces, apparatus, or circuitry.

Units described as separated components may or may not be physically separated, and the components serving as display circuitry may or may not be physically unitary. That is, the components may be located at one position or may be distributed over various network units. Optionally, some or all of the units may be selected to realize the solutions discussed herein.

The various functional circuitry of various embodiments may be integrated into one processing unit, or may present individually. Two or more system components may be integrated into one unit. The integrated unit may be realized in a hardware form, or in a form combining the hardware and software functional units.

Those of ordinary skilled in the art may understand that all or a part of the steps of various ones of the above embodiments may be realized via hardware relevant to the program demands, and previous programs may be stored in computer readable storage media. When the program is being executed, the steps of the above embodiments may be executed. The storage media described above may include portable storage device, Read-Only Memory (ROM), Random Access Memory (RAM), a magnetic disc, an optical disc or any other media that may store program codes.

When the described functions are implemented as software functions, and are sold or used as independent products, they may be stored in a computer accessible storage medium. Based on such understanding, the technical solutions of the present disclosure, or the portions contributing to the prior art may be embodied in the form of a software product. The computer software product may be stored in a machine readable storage medium, which may be non-transitory, and include several instructions to instruct a machine (e.g., a smartphone, tablet personal computer, a server, or a network device) to execute all or some of the method steps of the various embodiments. The storage medium described above may include portable storage device, ROM, RAM, a magnetic disc, an optical disc or any other media that may store program codes. Storage media may include multiple storage bits or other data storage units, such that the entire media may be located on a single disk, disc, array, or other storage device. However, storage media may also be distributed over multiple disks, discs, arrays, and/or other storage devices.

The example embodiments 1, 2, 3, and 4 are discussed separately to illustrate the techniques and architectures disclosed. However, the example embodiments may be combined or used together. Various features described in the context of a first of the example embodiments may be applied within the context of one or more of the other example embodiments.

Described above are example embodiments of the present disclosure, but the protection scope of the present disclosure is not limited thereto. Various embodiments were discussed other modifications and substitutions are readily conceivable by those skilled in the art.

What is claimed is:

1. An image processing method for a terminal having a processor and a storage medium having a program stored therein, and a user interface, the method comprising:
   inputting, into the terminal via the user interface, a first image including multiple pixels with corresponding pixel information;
   dividing, by the terminal, the first image into multiple segmented regions based on the pixel information;
   identifying, by the terminal, a segmented image from a first segmented region of the multiple segmented regions;
   selecting, by the terminal, a template image comprising an image rendering parameter;
   converting the first segmented region of the first image to a first intermediate image corresponding to grayscale information of the first segmented region of the first image;
   converting the first segmented region of the first image from RGBA (red, green, blue, alpha) format to HSV (hue, saturation, value) format;
   extracting a second intermediate image corresponding to value (V) information of the converted first segmented region of the first image;
   generating a third intermediate image by performing histogram equalization on the second intermediate image based on the segmented image; and
   generating, by the terminal, a second image corresponding to the first image by:
      generating a screen result image by performing screen blending on the first image and the first intermediate image; and
      generating a soft light result image by performing soft light blending on at least the screen result image and the third intermediate image.

2. The method according to claim 1, further comprising displaying, on a screen of the terminal, the second image.

3. The method according to claim 1, wherein dividing the first image into the multiple segmented regions comprises dividing the first image based on a maximum flow minimum cut algorithm.

4. The method according to claim 1, wherein the method further comprises:
   generating a fourth intermediate image by performing scaling on the template image based on the first segmented region; and
   where generating the second image further comprises alpha blending on the soft light result image and the fourth intermediate image.

5. The method according to claim 1 further including establishing a Gaussian mixture model for the first image.

6. The method according to claim 5 further including:
   using the Gaussian mixture model to represent pixel information for each pixel point of the first image; and
   applying a maximum flow minimum cut algorithm based on the pixel information to determine the multiple segmented regions.

7. A terminal comprising an input circuitry and processing circuitry:
   the input circuitry is configured to:
      input, into the terminal, a first image including multiple pixels with corresponding pixel information; and
      input, into the terminal, a template image, wherein the template image includes an image rendering parameter;
   the processing circuitry is configured to:
      divide the first image into multiple segmented regions based on the pixel information;
      identify a segmented image from a first segmented region of the multiple segmented regions;
      convert the first segmented region of the first image to a first intermediate image corresponding to grayscale information of the first segmented region of the first image;
      convert the first segmented region of the first image from RGBA (red, green, blue, alpha) format to HSV (hue, saturation, value) format;
      extract a second intermediate image corresponding to value (V) information of the converted first segmented region of the first image;
      generate a third intermediate image by performing histogram equalization on the second intermediate image based on the segmented image; and
      generate a second image corresponding to the first image by:
         generating a screen result image by performing screen blending on the first image and the first intermediate image; and
         generating a soft light result image by performing soft light blending on at least the screen result image and the third intermediate image.

8. The terminal according to claim 7, wherein:
   generating the second image further comprises alpha blending based on the template image and the soft light result image.

9. The terminal according to claim 7, wherein:
   the processing circuitry is further configured to divide the first image into the multiple segmented regions based on a maximum flow minimum cut method.

10. The terminal according to claim 7, wherein:
    the processing circuitry is further configured to:
       generate a fourth intermediate image by performing scaling on the template image based on the first segmented region; and
       generate the second image further by performing alpha blending on the soft light result image and the fourth intermediate image.

11. The terminal according to claim 7, further comprising a screen configured to display the second image.

12. The terminal according to claim 7, wherein the processing circuitry is further configured to establish a Gaussian mixture model for the first image.

13. The terminal according to claim 12, wherein the processing circuitry is further configured to:
    use the Gaussian mixture model to represent pixel information for each pixel point of the first image; and
    apply a maximum flow minimum cut algorithm based on the pixel information to determine the multiple segmented regions.

14. A non-transitory machine readable storage media, storing computer program instructions which when executed by at least one processor perform:
    inputting a first image including multiple pixels with corresponding pixel information;
    dividing the first image into multiple segmented regions based on the pixel information;
    identifying a segmented image from a first segmented region of the multiple segmented regions;
    converting the first segmented region of the first image to a first intermediate image corresponding to grayscale information of the first segmented region of the first image;

converting the first segmented region of the first image from RGBA (red, green, blue, alpha) format to HSV (hue, saturation, value) format;

extracting a second intermediate image corresponding to value (V) information of the converted first segmented region of the first image;

generating a third intermediate image by performing histogram equalization on the second intermediate image based on the segmented image;

inputting a template image comprising an image rendering parameter; and generating a second image corresponding to the first image by:

generating a screen result image by performing screen blending on the first image and the first intermediate image; and generating a soft light result image by performing soft light blending on at least the screen result image and the third intermediate image.

15. The non-transitory machine readable storage media according to claim 14, wherein generating the second image further comprises alpha blending based on the template image and the soft light result image.

16. The non-transitory machine readable storage media according to claim 15, wherein dividing the first image into the multiple segmented regions comprises dividing the first image based on a maximum flow minimum cut algorithm.

17. The non-transitory machine readable storage media according to claim 14, wherein the at least one processor is further configured to perform:

generating a fourth intermediate image by performing scaling on the template image based on the first segmented region of the first image; and generating the second image further by performing alpha blending on the soft light result image and the fourth intermediate image.

18. The non-transitory machine readable storage media according to claim 14, wherein the at least one processor is further configured to perform:

displaying, on a screen of a terminal, the second image.

19. The non-transitory machine readable storage media according to claim 14, wherein the at least one processor is further configured to establish a Gaussian mixture model for the first image.

20. The non-transitory machine readable storage media according to claim 19, wherein the at least one processor is further configured to:

use the Gaussian mixture model to represent pixel information for each pixel point of the first image; and apply a maximum flow minimum cut algorithm based on the pixel information to determine the multiple segmented regions.

* * * * *